US011576037B2

(12) United States Patent
Sun et al.

(10) Patent No.: US 11,576,037 B2
(45) Date of Patent: Feb. 7, 2023

(54) ISSUING OFFLINE PKI CERTIFICATES IN DISTRIBUTED V2X NETWORK

(71) Applicant: Huawei Technologies Co., Ltd., Shenzhen (CN)

(72) Inventors: Sheng Sun, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 465 days.

(21) Appl. No.: 16/657,433

(22) Filed: Oct. 18, 2019

(65) Prior Publication Data

US 2021/0120404 A1    Apr. 22, 2021

(51) Int. Cl.
| | |
|---|---|
| *G06F 21/00* | (2013.01) |
| *G06F 21/55* | (2013.01) |
| *G06F 21/56* | (2013.01) |
| *H04W 12/037* | (2021.01) |
| *H04L 9/32* | (2006.01) |
| *H04W 4/70* | (2018.01) |
| *H04W 4/40* | (2018.01) |
| *H04W 12/041* | (2021.01) |
| *H04W 12/069* | (2021.01) |

(52) U.S. Cl.
CPC ......... *H04W 12/037* (2021.01); *H04L 9/3247* (2013.01); *H04L 9/3263* (2013.01); *H04W 4/40* (2018.02); *H04W 4/70* (2018.02); *H04W 12/041* (2021.01); *H04W 12/069* (2021.01)

(58) Field of Classification Search
CPC ....... H04W 12/037; H04W 4/70; H04W 4/40; H04W 12/069; H04W 12/041; H04L 9/3247; H04L 9/3263

USPC .................................................... 726/2
See application file for complete search history.

(56) References Cited

U.S. PATENT DOCUMENTS

| | | | | |
|---|---|---|---|---|
| 9,912,479 | B1* | 3/2018 | Yamada | H04L 9/002 |
| 10,324,790 | B1* | 6/2019 | Franklin | G06F 3/0619 |
| 2015/0089215 | A1* | 3/2015 | Hattori | H04L 9/321 |
| | | | | 713/156 |

(Continued)

FOREIGN PATENT DOCUMENTS

| | | | | |
|---|---|---|---|---|
| CN | 102833040 A | * | 12/2012 | H04L 1/0045 |
| CN | 103905198 A | * | 7/2014 | |

(Continued)

OTHER PUBLICATIONS

Simplicio Jr., M., et al., "Privacy-preserving linkage/revocation of VANET certificates without LAs", IEEE Transactions on Intelligent Transportation Systems vol. 22, Issue: 6, Jun. 2021, 24 Pages.

(Continued)

*Primary Examiner* — Haresh N Patel
(74) *Attorney, Agent, or Firm* — Slater Matsil, LLP

(57) ABSTRACT

Method and system for issuing public key infrastructure (PKI) certificates in a peer-to-peer wireless communication network, comprising generating, at a first certificate authority (CA) node in the peer-to-peer communication network, a PKI certificate based on public key information received from an applicant node in the peer-to-peer wireless communication network; and transmitting the PKI certificate generated by the first CA node to the applicant node using the peer-to-peer wireless communication network.

18 Claims, 7 Drawing Sheets

(56) References Cited

U.S. PATENT DOCUMENTS

| | | | |
|---|---|---|---|
| 2016/0233979 A1* | 8/2016 | Koike-Akino | H04L 1/0035 |
| 2017/0202046 A1* | 7/2017 | Lee | H04W 4/08 |
| 2019/0220603 A1 | 7/2019 | Gopalakrishnan et al. | |
| 2019/0245703 A1* | 8/2019 | Simplicio Junior, Jr. | H04L 9/0894 |
| 2019/0363843 A1* | 11/2019 | Gordaychik | H04W 52/54 |
| 2020/0036784 A1* | 1/2020 | Lynar | H04L 67/1008 |
| 2021/0083882 A1* | 3/2021 | Venable, Sr. | H04L 9/3247 |

FOREIGN PATENT DOCUMENTS

| | | | | |
|---|---|---|---|---|
| CN | 105812131 A | | 7/2016 | |
| CN | 109039654 A | | 12/2018 | |
| EP | 3082356 A1 | * | 10/2016 | H04L 9/3247 |
| EP | 3340530 A1 | * | 6/2018 | H04L 63/0823 |
| EP | 2355560 B1 | * | 4/2019 | H01Q 1/28 |
| EP | 3637345 A1 | * | 4/2020 | G06Q 20/38215 |
| JP | 2005525721 A | * | 8/2005 | H01Q 1/28 |
| JP | 2010016465 A | * | 1/2010 | |
| JP | 2020123875 A | * | 8/2020 | H01Q 1/28 |
| WO | 2019198837 A1 | | 10/2019 | |

OTHER PUBLICATIONS

Simplicio Jr., M., et al., "The Unified Butterfly Effect: Efficient Security Credential Management System for Vehicular Communications", 2018 IEEE Vehicular Networking Conference (VNC), Dec. 5-7, 2018, 8 Pages.

* cited by examiner

ISSUING OFFLINE PKI CERTIFICATES IN DISTRIBUTED V2X NETWORK

TECHNICAL FIELD

The present disclosure relates to systems and methods for issuing public key infrastructure (PKI) certificates in distributed vehicle-to-everything (V2X) networks.

BACKGROUND

Vehicle-to-everything (V2X) communication enables a vehicle to communicate with surrounding entities such as, among other things, other vehicles, cell towers, access points, roadway infrastructure elements, smart grid elements, and pedestrians. V2X communication may, for example, include device-to-device communication such as vehicle-to-vehicle (V2V), vehicle-to-infrastructure (V2I), vehicle-to-grid (V2G), and vehicle-to-pedestrian (V2P), as well as device-to-network (V2N) communication such as cellular network based C-V2X communication, and wireless local area network (WLAN) based communication. Different protocols have been, or are being, developed to support V2X communication, including, for example, the WLAN based IEEE 802.11p protocol released in 2012, the V2X protocol defined as Long-Term Evolution (LTE) V2X in the $3^{rd}$ Generation Partnership Project (3GPP) releases 14 and 15, and the V2X protocols being developed under release 15.

The information provided and received by entities within a V2X network may, in some applications, impact the actions of traffic control systems and individual vehicle control systems, and may also be relied on by entities such as insurance companies and governments. Given the potential safety, financial, legal and regulatory impact of information exchanged within a V2X network, preserving the integrity of the information is of great importance. In this regard, V2X communication may incorporate traditional data integrity safeguards such as the use public key infrastructure (PKI) certificates.

Typically, PKI certificates are issued by a centralized certificate issuing entity. In the case where a vehicle has on-line access to such a centralized certificate issuing entity, for example through a cellular network connection, such certificates can be issued and renewed using conventional protocols. However, in some cases, a vehicle may be off-line relative to the centralized certificate issuing entity, meaning that the vehicle does not have access to the centralized certificate issuing entity at the time that the vehicle requires a PKI certificate. Such a situation may, for example, occur if the vehicle is not within range of a cellular network, if the cellular network is denying access to the vehicle due to network capacity issues or other reasons, if a communication breakdown occurs between the cellular network and the certificate issuing entity, or if the certificate issuing entity has experienced a temporary failure or is currently unavailable for other reasons.

Accordingly, there is a need for a method and system that facilitates the issuance of PKI certificates to an entity, such as a vehicle, that does not have access to a centralized certificate issuing entity at the time that the vehicle requires one or more PKI certificates.

SUMMARY

According to a first example aspect of the disclosure, a method is disclosed for issuing public key infrastructure (PKI) certificates in a peer-to-peer wireless communication network. The method includes generating, at a first certificate authority (CA) node in the peer-to-peer communication network, a PKI certificate based on public key information received from an applicant node in the peer-to-peer wireless communication network, and transmitting the PKI certificate generated by the first CA node to the applicant node using the peer-to-peer wireless communication network.

According to an example embodiment of the first aspect, the applicant node and the first CA node are each pre-configured with a common generator matrix, the public key information includes a public signature key generated by the applicant node using the generator matrix, and generating the PKI certificate at the first CA node comprises: generating an intermediate certificate based on a first key that is based on: (i) the public signature key generated by the applicant node and (ii) a product of the generator matrix and a random value received from the applicant node; signing the intermediate certificate; and encrypting the signed intermediate certificate to produce the PKI certificate. In some examples, the public key information includes a public encryption key calculated by the applicant node using the generator matrix, and encrypting the signed intermediate certificate to produce the PKI certificate is performed using a second key that is based on: (i) the public encryption key; (ii) the product of the generator matrix and the random value received from the applicant node.

In some examples of the first aspect, the method includes receiving the first key and the second key at the first CA node from a registration authority (RA) node in the peer-to-peer wireless communication network. In some examples the method includes: at the first CA node: receiving a first random value calculated at the RA node; calculating a first intermediate value based on the product of the generator matrix and the first random value; and receiving a second intermediate value from a second CA node within the peer-to-peer wireless communication network, the second intermediate value being calculated by the second CA node based on the product of the generator matrix and a second random value calculated at the RA node, wherein the intermediate certificate generated by the first CA node is also based on the first intermediate value and the second intermediate value.

In some examples of the first aspect, the CA node calculates the first and second keys.

In some examples of the first aspect, the peer-to-peer wireless communication network is a sidelink (SL) vehicle-to-anything (V2X) communication network and the applicant node and the CA node are each implemented by processor enabled control units that are located onboard respective vehicles.

In some examples of the first aspect, the first CA node is one of a plurality of CA nodes in the peer-to-peer wireless communication network that collectively implement a distributed CA, and the method includes: generating respective PKI certificates based on the public key information at a plurality of the CA nodes; and transmitting the PKI certificates to the applicant node using the peer-to-peer wireless communication network.

According to a second example aspect of the disclosure an electronic device is disclosed that includes a processor system; a wireless transceiver system coupled to the processor system for exchanging information with a peer-to-peer wireless communication network; and memory coupled to the processor system. The memory stores executable instructions that when executed by the processor system configure the electric device to: generate a public key infrastructure (PKI) certificate based on public key information received from an applicant node in the peer-to-peer wireless communication network; and transmit the PKI certificate to the applicant node using the peer-to-peer wireless communication network.

In some examples of the second aspect, the public key information includes a public signature key calculated by the applicant node using a generator matrix, and the electronic device is configured to generate the PKI certificate by: generating an intermediate certificate based on a first key that is based on: (i) the public signature key and (ii) a product of the generator matrix and a random value received from the applicant node; signing the intermediate certificate; and encrypting the signed intermediate certificate to produce the PKI certificate.

In some example s of the second aspect, the public key information includes a public encryption key calculated by the applicant node using the generator matrix, and the electronic device is configured to encrypt the signed intermediate certificate to produce the PKI certificate using a second key that is based on: (i) the public encryption key; and (ii) the product of the generator matrix and the random value received from the applicant node. In some examples, the electronic device is configured to receive the first key and the second key from a registration authority (RA) node in the peer-to-peer wireless communication network.

In some examples of the second aspect, the electronic device is configured to: receive a first random value calculated at the RA node; calculate a first intermediate value based on the product of the generator matrix and the first random value; and receive a second intermediate value from a second electronic device within the peer-to-peer wireless communication network, the second intermediate value being calculated by the second CA node based on the product of the generator matrix and a second random value calculated at the RA node. The intermediate certificate generated by the electronic device is also based on the first intermediate value and the second intermediate value.

In some examples of the second aspect, the electronic device is configured to calculate the first and second keys.

In some examples of the second aspect, the peer-to-peer wireless communication network is a sidelink (SL) vehicle-to-anything (V2X) communication network and the electronic device is located on a vehicle.

According to a third example aspect of the disclosure a method of obtaining public key interface (PKI) certificates is disclosed that comprises: at an application node in a peer-to-peer wireless communication network: calculating a public signature key; calculating a public encryption key; generating a plurality of random values; transmitting a request for a PKI certificate for each of a plurality of respective nodes in the peer-to-peer wireless communication network, each request including a copy of the public signature key, a copy of the public encryption key and a respective random value from the plurality of random values; and receiving and storing a plurality of certificates that are based on the public signature key and the private signature key and are transmitted to the application node using the peer-to-peer wireless communication network.

In some examples of the third aspect, the respective nodes are registration authority (RA) nodes in a distributed RA, the method comprising: at each RA node: calculating a first key that is based on: (i) the public signature key and (ii) a product of a generator matrix used to generate the public signature key and the respective random value transmitted for the respective node; calculating a second key that is based on: (i) the public encryption key and (ii) the product of the generator matrix and the respective random value transmitted for the respective node; generating first and second random values; transmitting the first key, second key and the first random value for a first associated certificate authority (CA) node in the peer-to-peer wireless communication network; and transmitting the first key, second key and the second random value for a second associated certificate authority (CA) node in the peer-to-peer wireless communication network.

In some examples of the third aspect, the method includes: at each first CA node associated with a respective RA node: calculating a first intermediate value based on the product of the generator matrix and the first random value received from the respective RA node; receiving, from the second CA node associated with the same respective RA node, a second intermediate value based on the product of the generator matrix and the second random value received from the respective RA node; generating a PKI certificate using the first key, the second key, the first intermediate value and the second intermediate value; and transmitting the PKI certificate generated by the first CA node to the applicant node using the peer-to-peer wireless communication network. In some examples, generating the PKI certificate at each first CA node associated with a respective RA node comprises: generating an intermediate certificate based on a combination of the first key, the first intermediate value and the second intermediate value; signing the intermediate certificate; and encrypting the signed intermediate certificate using the second key to produce the PKI certificate.

In some examples of the third aspect, the peer-to-peer wireless communication network is a sidelink (SL) vehicle-to-anything (V2X) communication network and the applicant node and at least some of the respective nodes are each implemented by processor enabled control units that are located onboard respective vehicles.

DESCRIPTION OF EXAMPLE EMBODIMENTS

For convenience, the present disclosure describes example embodiments of methods and systems with reference to a motor vehicle, such as a car, truck, bus, boat or ship, submarine, aircraft, warehouse equipment, construction equipment, tractor or other farm equipment. The teachings of the present disclosure are not limited to any particular type of vehicle, and may be applied to vehicles that do not carry passengers as well as vehicles that do carry passengers. Among other things, the methods and systems described in the present disclosure may be implemented in non-autonomous, semi-autonomous and autonomous robotic vehicles.

Figure 1:
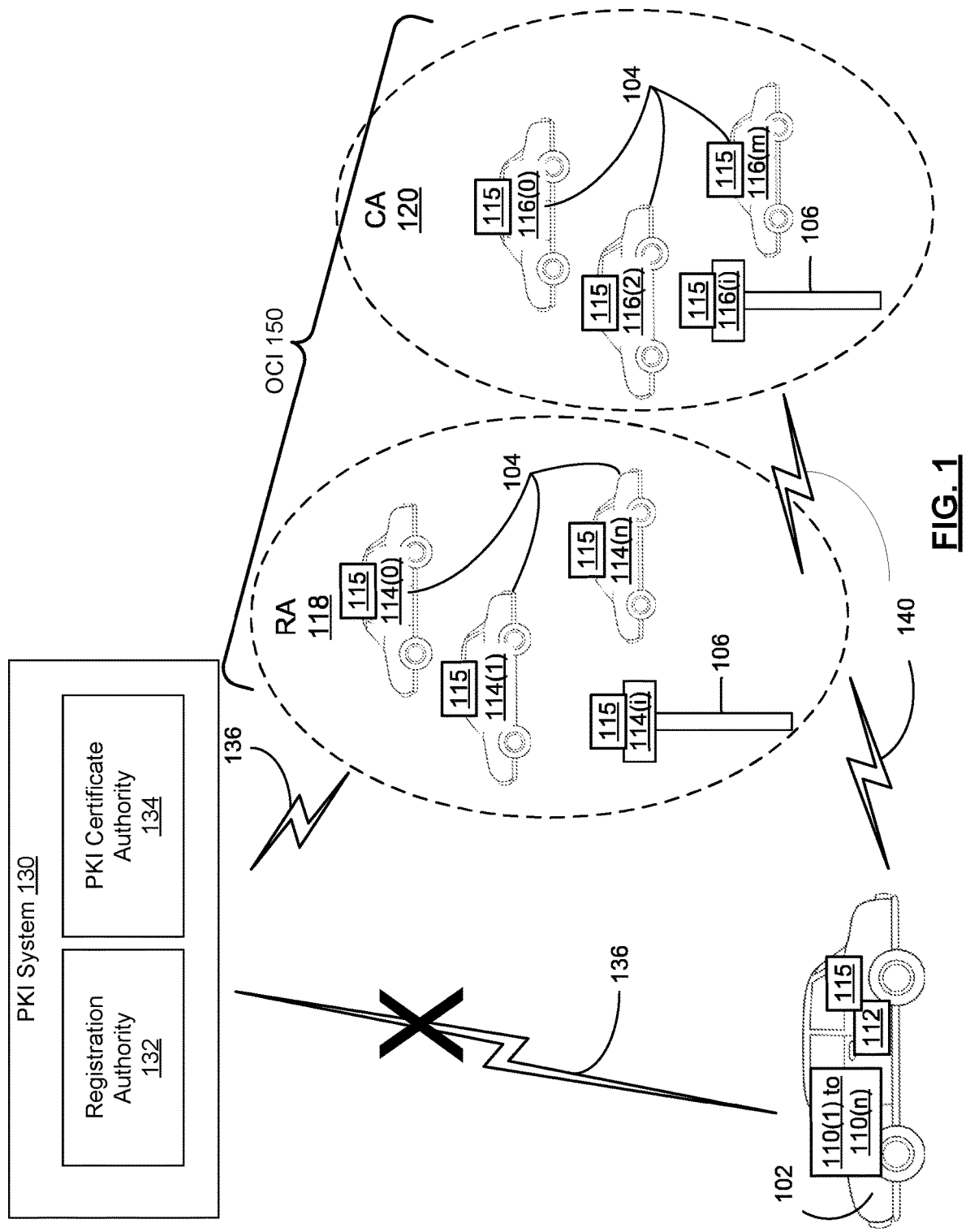
FIG. 1 is a schematic diagram of an offline PKI certificate issuing system relating to example embodiments of the present disclosure.

FIG. 1 is a schematic diagram illustrating an environment in which offline public key infrastructure (PKI) certificates can be issued according to example embodiments. FIG. 1 illustrates a plurality of entities, including a subject vehicle 102, a plurality of other vehicles 104, and infrastructure elements 106 (e.g., a stationary pole-mounted traffic camera). Each of the subject vehicle 102, other vehicles 104 and infrastructure elements 106 includes a respective on-board processor-enabled electronic device in the form of a control unit 115 that is enabled for wireless communication. In example embodiments, the control units 115 of subject vehicle 102, other vehicles 104 and infrastructure elements 106 are configured to communicate with a remote registration and authentication system 130 through a wireless wide area network (WAN) 136 (e.g., a cellular network). By way of example, control units 115 may be configured to use one or more cellular vehicle-to-network (C-V2N) protocols to enable communications over WAN 136. Additionally, the control units 115 are also enabled to communicate peer-to-peer with each other using wireless local area networks. In this regard, control units 115 may be configured to use one or more vehicle-to-everything (V2X) protocols to enable a peer-to-peer sidelink (SL) V2X communication network 140.

In example embodiments, in addition to processor enabled control unit 115, the subject vehicle 102 also includes a plurality of additional on-board processor enabled electronic devices 110(1) to 110(n). Among other things, electronic devices 110(1) to 110(n) may include devices or units that can sense, collect and process information about the environment of the subject vehicle 102. By way of example, on-board electronic devices 110(1) to 110(n) associated with subject vehicle 102 may include one or more devices that sense and process information about the physical environment surrounding the vehicle such as light detection and ranging (LIDAR) units, radio detecting and ranging (RADAR) units, and/or video camera units. Electronic devices 110(1) to 110(n) may also include devices that collect and process information about the kinodynamic operating environment of subject vehicle 102 such as inertial measurement units (IMUs), speedometer units and other vehicle kinodynamic measurement units. Electronic devices 110(1) to 110(n) may also include devices that collect and process information about the geographic location of subject vehicle 102 such as a global positioning satellite unit.

In example embodiments, the control unit 115 of the subject vehicle 102 is configured to function as an applicant node 112 that can apply for PKI certificates. When the applicant node 112 is online, it can communicate through WAN 136 with one or more centralized remote systems, including a PKI system 130. In example embodiments, PKI system 130 includes one or more computer systems, such as servers, that are configured to implement a registration authority 132 and a PKI certificate authority 134. When the applicant node 112 is online it can communicate with registration authority 132 through WAN 136 to perform a registration procedure that verifies the identity of the applicant node 112. In example embodiments, conventional PKI registration procedures can be used for this purpose. Furthermore, in example embodiments, the applicant nodes 112 each may also perform respective registration procedures with the registration authority 132 through WAN 136 on behalf of the subject vehicle electronic devices 110(1) to 110(n).

Similarly, when the applicant node 112 is online it can request the issuance of digital PKI certificates for both itself and the electronic devices 110(1) to 110(n) from the certificate authority 134. In example embodiments, conventional PKI certificate issuance procedures can be used for this purpose.

However, when the applicant node 112 is offline with respect to PKI system 130 (for example, when the subject vehicle 102 is in a region that is not serviced by WAN 136, or applicant node 112 is otherwise denied access to WAN 136 or to PKI system 130), it cannot communicate through WAN 136 with PKI system 130. This situation can be problematic in the event that new PKI certificates are required when the applicant node 112 is offline. In such circumstances, it may be necessary for one or more of the control units 115 to ignore or suspend communications in order to avoid to man-in-the-middle (MITM) or imposter attacks.

Accordingly, example embodiments are described that enable a group of control units 115 of other vehicles 104 and/or infrastructure elements 106 to collectively function as an offline certificate issue (OCI) system 150. In example embodiments, the control units 115 of the subject vehicle 102, the other vehicles 104 and the infrastructure elements 106 are configured by OCI software to implement respective nodes in the OCI system 150 as described below.

As shown in FIG. 1, at least some of the control units 115 in SL V2X communication network 140 are configured by their respective OCI software to implement a virtual distributed registration authority (RA) 118 and a virtual distributed certificate authority (CA) 120. In particular, a group of n+1 control units 115 are configured to implement RA nodes 114(0) to 114(n) and a group of m+1 control units are configured to implement (CA) nodes 116(0) to 116(m). In example embodiments m≥n, and n+1 corresponds to the number of PKI certificates requested by the subject vehicle 102 (for example, subject vehicle 102 requires a PKI certificate for the control unit 115 and n PKI certificates (one PKI certificate each) for electronic devices 110(1) to 110(n)). The n+1 RA nodes 114(0) to 114(n) cooperatively implement virtual distributed RA 118 and the m+1 CA nodes 116(0) to 116(m) cooperatively implement virtual distributed CA 120. In some example embodiments, the membership of RA 118 and CA 120 is randomly determined from among the control units 115 that are in communication with the SL V2X communication network 140. In some examples, membership of RA 118 and CA 120 is selected based on predetermined criteria.

Figure 2:
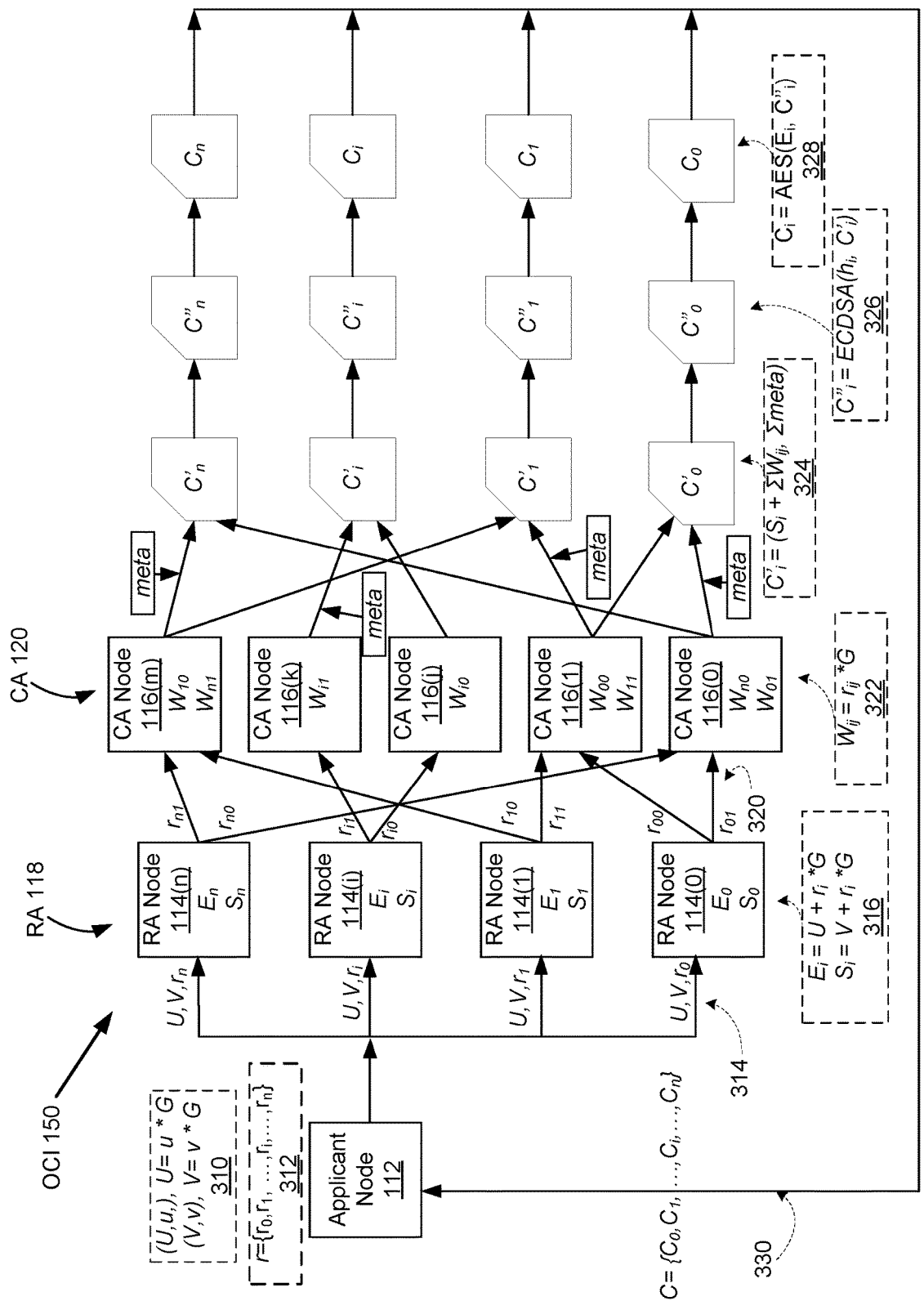
FIG. 2 is a graphical representation of an offline PKI certificate issuing process applied by the system of FIG. 1 in accordance with an example embodiment of the present disclosure.
Figure 3:
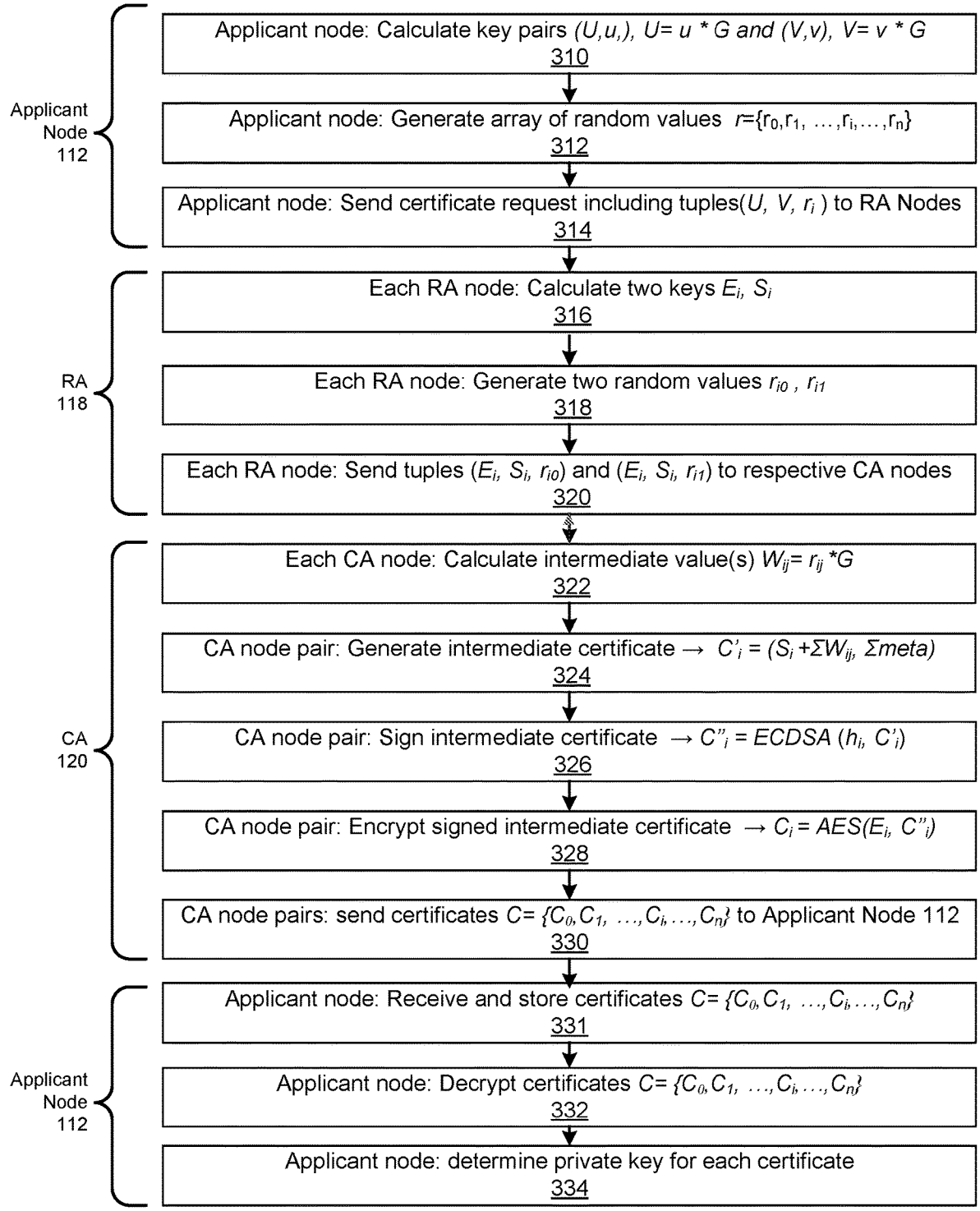
FIG. 3 is a block diagram illustrating the offline PKI certificate issuing process of FIG. 2.

FIGS. 2 and 3 each illustrate operation of the OCI system 150 implemented by the applicant node 112, RA nodes 114(0) to 114(n) and CA nodes 115(0) to 115(m) according to example embodiments. Dashed blocks and lines are used in FIG. 2 to represent actions that correspond to the process blocks that are identified by the same reference numbers in the flow diagram of FIG. 3. As a precondition to the operation of OCI system 150, the applicant node 112, RA nodes 114(0) to 114(n) and CA nodes 115(0) to 115(m) are each preconfigured with a common generator matrix G. As indicated by block 310, a certificate issuing procedure begins with the applicant node 112 calculating key information that includes two pairs of public and private keys (U,u) and (V,v), where: $U=u*G$ and $V=v*G$; $U,u$ are a public, private encryption key pair and $V,v$ are public, private signature key pair. In some examples, private keys u, v may be based on a unique identifier associated with controller 115, for example a vehicle identification number of the vehicle that the controller 115 is located in. As indicated in block 312, the applicant node 112 also generates an array of n+1 random values, $r=\{r_0, r_1, \ldots, r_i, \ldots, r_n\}$. As noted above, n+1 is the number of PKI certificates the applicant node 112 is requesting. In example embodiments, the random values $r=\{r_0, r_1, \ldots, r_i, \ldots, r_n\}$ are used to prevent fraud at RA nodes 114(0) to 114(n) and mitigate against man-in-the-middle (MITM) attacks in the OCI system 150.

The applicant node 112 then requests n+1 PKI certificates by transmitting its public key information (e.g., public encryption and signature keys U,V) and the random value array $r=\{r_0, r_1, \ldots, r_i, \ldots, r_n\}$ to the distributed RA 118 using SL V2X communication network 140. In particular, as indicated by block 314 in FIG. 3, and graphically illustrated in FIG. 2, the applicant node 112 sends PKI certificate request that includes a respective tuple (U, V, $r_i$) (e.g., copies of the applicant nodes 112's public encryption key and public signature key, along with a respective one of the n+1 random values $\{r_0, r_1, \ldots, r_i, \ldots, r_n\}$) to each of the n+1 RA nodes 114(0) to 114(n). In example embodiments the applicant node 112 randomly assigns the random values from the array $r=\{r_0, r_1, \ldots, r_i, \ldots, r_n\}$ to the respective tuples (U, V, $r_i$) sent to the RA nodes 114(0) to 114(n). In some examples, a gossip protocol may be used for transmitting the tuples to the RA nodes 114(0) to 114(n).

As explained in the following paragraphs, the distributed RA 118 is configured by its member RA nodes 114(0) to 114(n) to calculate a set of n+1 certificate encryption keys $\{E_0, E_1, \ldots, E_i, \ldots, E_n\}$, a set of n+1 public signature keys $\{S_0, S_1, \ldots, S_i, \ldots, S_n\}$ and a set of n+1 random value pairs $\{(r_{00}, r_{01}), (r_{i0}, r_{i1}), \ldots, (r_{n0}, r_{n1})\}$ that are then transmitted using SL V2X communication network 140 to the distributed CA 118.

In this regard, as indicated by block 316, upon receipt of its respective tuple (U, V, $r_i$) from the applicant node 112, each RA node 114(i) calculates first and second keys, namely public signature key $S_i = V + r_i*G$ and public encryption key $E_i = U + r_i*G$. As will be explained below, the first key $S_i$, which is the sum of the applicant node 112's public signature key V with the product of the generator matrix G and applicant node sourced random value $r_i$, is provided to a CA node 114(k) for the purpose of signing an intermediate certificate C'$_i$ generated by the OCI system 150. The second key $E_i$, which is the sum of the applicant node 112's public encryption key U with the product of the generator matrix G and applicant node sourced random value $r_i$, is used by the CA node 114(k) for the purpose of encrypting the signed intermediate certificate C"$_i$ generated by the OCI system 150.

As indicated by block 318, each RA node 114(i) also generates a respective pair of random values ($r_{i0}$, $r_{i1}$), and as indicated by block 320, each RA node 114(i) then sends a first tuple ($E_i$, $S_i$, $r_{i0}$) to a first associated CA node 116(j) and a second tuple ($E_i$, $S_i$, $r_{i1}$) to a second associated CA node 116(k), where j≠k, 0≤j≤m and 0≤k≤m. As will be explained in greater detail below, the first and second CA nodes 116(j), 116(k) that are associated with RA node 114(i) form a collaborating CA node pair for generating a unique PKI-based certificate $C_i$. Thus, each RA node 114(i) transmits the first and second keys $S_i$, $E_i$, that it has generated to a respective collaborating pair of CA nodes 116(j), 116(k), along with a unique random value to each CA node 116(j), 116(k) of the pair (e.g., $r_{i0}$ to CA node 116(j) and $r_{i1}$ to CA node 116(k)). The random value pairs ($r_{i0}$, $r_{i1}$) are used to mitigate against fraud and mitigate against man-in-the-middle (MITM) attacks in the OCI system 150. As illustrated in FIG. 2, multiple RA nodes 114(1) to 114(n) can send tuples to the same CA Node 116(i). Thus, the same CA Node 116(i) can be a member of more than one pair of collaborating CA node pairs. For example, in the illustration of FIG. 2, CA node 116(m) receives tuple ($E_n$, $S_n$, $r_{n1}$) from RA node 114(n) and tuple ($E_1$, $S_1$, $r_{10}$) from RA node 114(1). CA node 116(m) is part of a collaborating CA node pair that is associated with RA node 114(n) and includes CA nodes 116(m) and 116(0), and CA node 116(m) is also part of a further collaborating CA node pair that is associated with RA node 114(1) and includes CA nodes 116(m) and 116(1). In example embodiments, the association of collaborating pairs of CA nodes 116(1) to 116(m) with respective RA nodes 114(1) to 114(n) may be determined during formation and ongoing operation of the OCI system 150 based on predetermined criteria.

As explained in the following paragraphs, the distributed CA 120 is configured by its member CA nodes 116(0) to 116(m) to generate a set of n+1 PKI certificates $C=\{C_0, C_1, \ldots, C_i, \ldots, C_n\}$ that are then transmitted using SL V2X communication network 140 to the applicant node 112.

In this regard, as indicated by block 322, each CA node 116(j) is configured to calculate an intermediate value $W_{ij} = r_{ij}*G$ for each random value that the CA node 116(j) receives from its associated RA node(s) 114(i). For illustration, in the example of FIG. 2, CA node 116(0) calculates intermediate value $W_{01} = r_{01}*G$ in respect of the random value $r_{01}$ transmitted to CA node 116(0) by RA node 114(0) and CA node 116(0) also calculates intermediate value $W_{n0} = r_{n0}*G$ in respect of the random value $r_{n0}$ transmitted to CA node 116(0) by RA node 114(0).

As indicated by blocks 324, 326 and 328 of FIG. 3 and graphically illustrated in FIG. 2, each collaborating pair of CA nodes 116(j), 116(k) that are associated with a common RA node 114(i) are configured to collaboratively generate an intermediate certificate C'$_i$, sign the intermediate certificate and encrypt the signed certificate C"$_i$ to output a PKI based certificate $C_i$. In some examples, collaboration between CA nodes 116(j), 116(k) of a collaborating pair involves one of the CA nodes (eg. CA node 116(j)) transmitting the intermediate value $W_{ij}$ that it has calculated to the other CA node (e.g. CA node 116(k)) of the collaborating pair, and the receiving node (e.g. CA node 116(k)) then independently performs the subsequent operations required to generate intermediate certificate C'$_i$, sign the intermediate certificate C'$_i$, encrypt the signed intermediate certificate C"$_i$, and transmit the resulting signed, encrypted PKI-based certificate $C_i$. In some examples the CA node 116(j) or 116(k) selected for each collaborating CA node pair as the CA node 116(j) or 116(k) that generates intermediate certificate C'$_i$, signed intermediate certificate C"$_i$, and encrypted PKI-based certificate $C_i$ may be determined during formation and ongoing operation of the OCI system 150 based on predetermined criteria. In at least some examples the node selected for each collaborating CA node pair is selected so that within distributed CA 120, n+1 of the CA nodes 116(0) to 116(m) are selected and any one particular CA node 116(0) to 116(m) only needs to generate one set of an intermediate certificate C'$_i$, signed intermediate certificate C"$_i$, and PKI-based certificate $C_i$ during an iteration of the certificate issuing process of FIGS. 2 and 3.

In this regard, as shown by block 324, each collaborating pair of CA nodes 116(j), 116(k) that are associated with a common RA node 114(i) is configured to collectively generate a respective intermediate certificate C'$_i = (S_i + \Sigma W_{ij}$, Σmeta). As shown, the intermediate certificate C, includes two values, namely: (1) $S_i+\Sigma W_{ij}$, which is the sum of: (a) the public signature key $S_i$ calculated by the common associated RA node 114(i); and (b) the sum of the intermediate values $W_{ij}$ respectively calculated by the two CA nodes 116(j), 116(k) based on the random vales $r_{i0}$ and $r_{i1}$ received from the common RA node 114(i); and (2) Σmeta which is the sum of a predetermined set of metadata items. In example embodiments, the metadata items include unique identification values for each of the CA nodes 116(j), 116(k) for the CA node pair and a time stamp. By way illustration, in the example embodiment illustrated in FIG. 2, the CA Node 116(j) transmits the intermediate value $W_{i0}$ (calculated based on random value $r_{i0}$) to the selected collaborating node 116(k), which in turn calculates first intermediate certificate $C'_i=(S_i+\Sigma W_{ij}, \Sigma meta)$, where $\Sigma W_{ij}=W_{i0}+W_{i1}$.

As shown by block 326, the selected CA node 116(k) of each collaborating pair of CA nodes 116(j), 116(k) is configured to sign the intermediate certificate $C'_i$ with its own private key $h_i$ to generate signed intermediate certificate $C''_i$=ECDSA $(h_i, C'_i)$, where ECDSA refers to an Elliptical Curve Digital Signature Algorithm such as the ECDSA specified by National Institute of Standards and Technology (NIST) Federal Information Processing Standards (FIPS) publication FIPS PUB 186-4.

As shown by block 328, the selected CA node 116(k) of each collaborating pair of CA nodes 116(j), 116(k) is configured to then encrypt the signed intermediate certificate $C''_i$ using the public encryption key $E_i$ to output encrypted PKI-based certificate $C_i$=AES$(E_i, C''_i)$, where AES refers to an Advanced Encryption Standard (AES) algorithm. In example embodiments the PKI-based certificate $C_i$ is a x.509 PKI certificate. The PKI-based certificate $C_i$ is then transmitted by CA Node 116(k) to the applicant node 112 via SL V2X communication network 140 (block 330). Thus, collectively, the n+1 selected CA nodes of CA 120 issue a set C of n+1 PKI-based certificates, C={$C_0, C_1, \ldots, C_i, \ldots, C_n$}, with each selected CA node transmitting a respective certificate to the applicant node 112 using SL V2X communication network 140. The applicant node 112 receives and stores the n+1 certificates C={$C_0, C_1, \ldots, C_i, \ldots, C_n$} (block 331).

At the completion of the PKI certificate issuing process, n+1 certificates C={$C_0, C_1, \ldots, C_i, \ldots, C_n$} are provided for respective use by the applicant node 112 and n electronic devices 110(1) to 110(n) of subject vehicle 102. In example embodiments, the applicant node 112 can decrypt each issued certificate C using the corresponding private key $(u+r_i)$ to recover signed intermediate certificate $C''_i$(block 332). The applicant node recovers intermediate certificate from signed intermediate certificate $C''_i$ using the public key $H_i$ that corresponds to the private key $h_i$ used at CA 120 to generate $C'_i$. The applicant node 112 can determine the public signature key $S_i$ for each certificate by calculating $S_i=V+r_i*G$ and then extract the summed intermediate value $\Sigma W_{ij}$ from intermediate certificate $C'_i$. The applicant node 112 can then compute the private signature key $s_i$ for each certificate $C_i$ as follows: $s_i=v+r_i+\Sigma W_{ij}$ (block 334).

Figure 4:
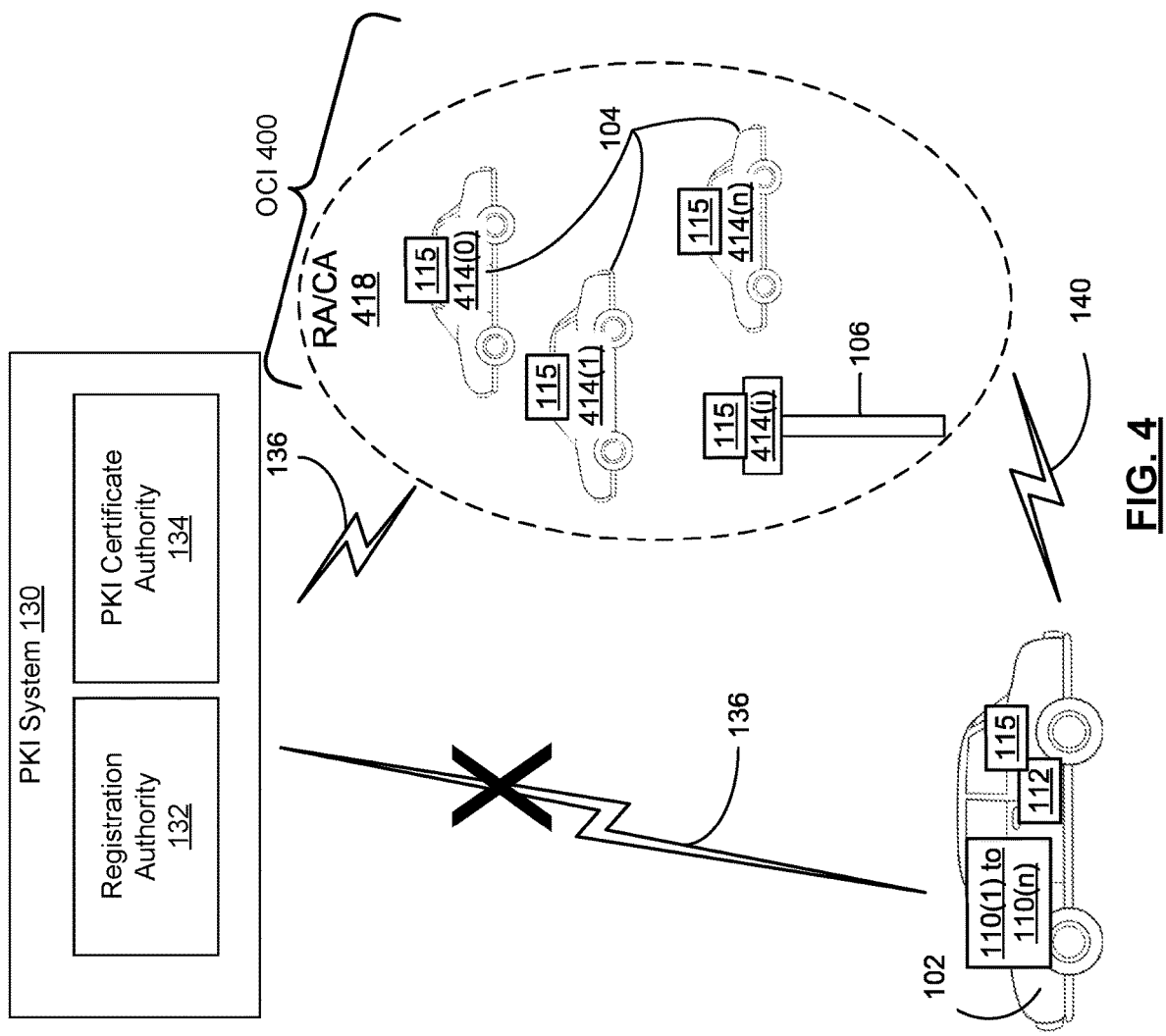
FIG. 4 is a schematic diagram of an offline PKI certificate issuing system relating to a further example embodiment of the present disclosure.
Figure 5:
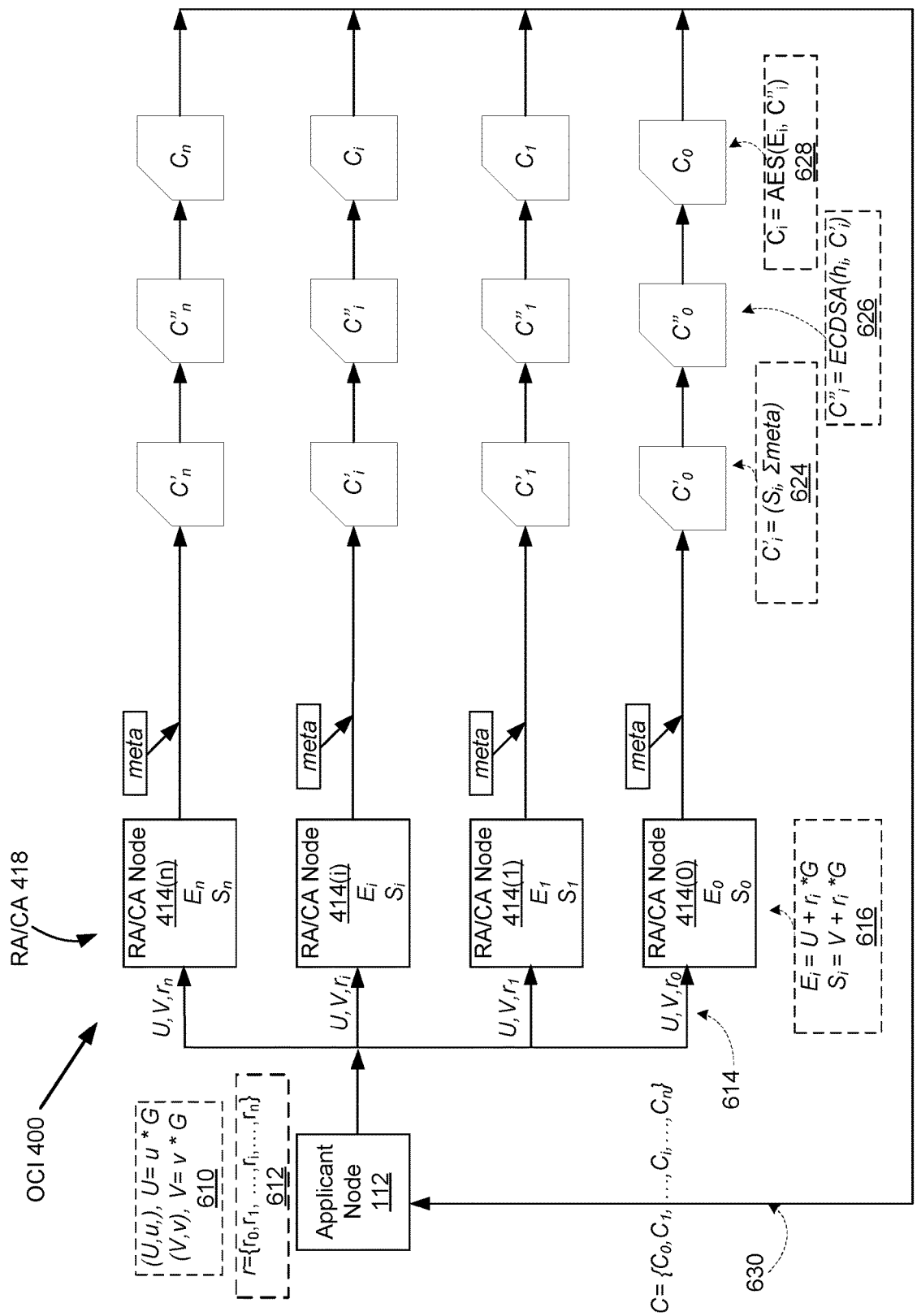
FIG. 5 is a graphical representation of an offline PKI certificate issuing process applied by the system of FIG. 4 in accordance with an example embodiment of the present disclosure.
Figure 6:
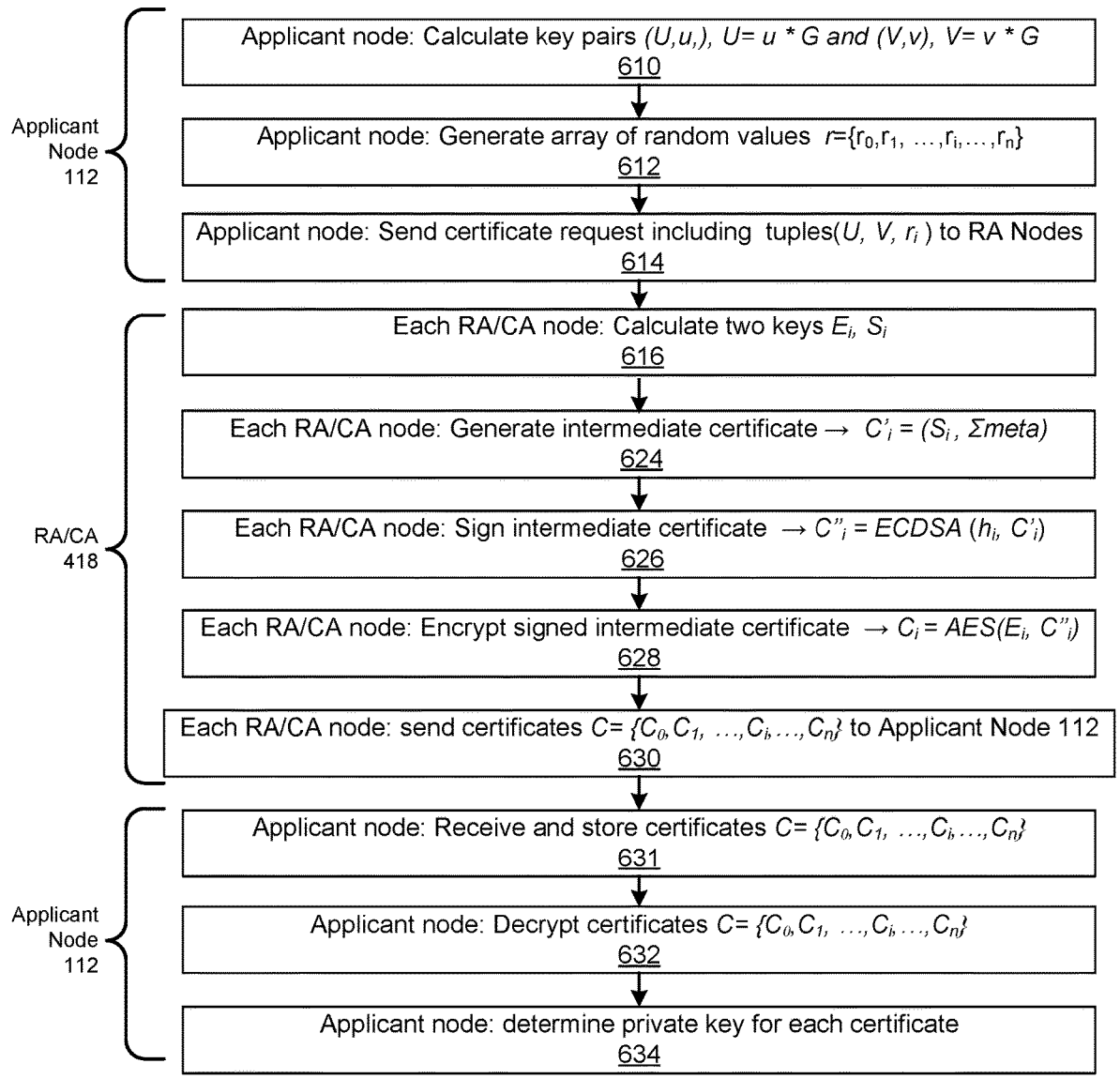
FIG. 6 is a block diagram illustrating the offline PKI certificate issuing process of FIG. 4.

In the example OCI system 150 illustrated in FIGS. 1-3, n+1 control units 115 are used within SL V2X communication network 140 for implementing the RA nodes 114(0) to 114(n) of distributed RA 118 and m+1 (where m≥n) further control units 115 are used within SL V2X communication network 140 for implementing the CA nodes 114(0) to 114(m) of distributed CA 120. In some circumstances, it may be necessary or beneficial to implement an OCI system with fewer control units 115. In this regard, FIGS. 4-6 illustrate the architecture and operation of a further OCI system 400 according to further example embodiments. Compared to the OCI system 150 described above, OCI system 400 may require fewer control units 115.

In the example shown in FIG. 4, at least some of the control units 115 in a SL V2X communication network 140 are configured by their respective OCI software to implement a group of n+1 dual function registration authority/certificate (RA) nodes 414(0) to 414(n) within SL communication network 140 that form a virtual distributed RA/CA. Once again, in example embodiments n+1 corresponds to the number of PKI certificates requested by the subject vehicle 102.

FIGS. 5 and 6 each illustrate operation of an OCI system 400 implemented by the applicant node 112 and RA/CA nodes 414(0) to 114(n) according to example embodiments. As a precondition to the operation of OCI system 150, the applicant node 112 and RA/CA nodes 414(0) to 414(n) are each preconfigured with a common generator matrix G. As indicated by block 610, a certificate issuing procedure begins with the applicant node 112 calculating key information that includes two pairs of public and private keys (U,u,) and (V,v), where: U=u*G and V=v*G; U,u are a public, private encryption key pair and V,v are a public, private signature key pair. As indicated in block 612, the applicant node 112 also generates an array of n+1 random values, r={$r_0, r_1, \ldots, r_i, \ldots, r_n$}. In example embodiments, the random values r={$r_0, r_1, \ldots, r_i, \ldots, r_n$} are used to prevent fraud and mitigate against man-in-the-middle (MITM) attacks in the OCI system 400.

The applicant node 112 then requests n+1 PKI certificates by transmitting its public encryption and signature keys U,V and the random value array r={$r_0, r_1, \ldots, r_i, \ldots, r_n$} to the distributed RA/CA 418 using SL V2X communication network 140. In particular, as indicated by block 614 in FIG. 6, and graphically illustrated in FIG. 5, the applicant node 112 sends a PKI certificate request that includes a respective tuple (U, V, $r_i$) (e.g. copies of the applicant nodes 112's public encryption key and public signature key, along with a respective one of the n+1 random values {$r_0, r_1, \ldots, r_i, \ldots, r_n$}) to each of the n+1 RA/CA nodes 414(0) to 414(n). In example embodiments, the applicant node 112 randomly assigns one value from the array r={$r_0, r_1, \ldots, r_i, \ldots, r_n$} to each of the tuples (U, V, $r_i$) sent to the RA/CA nodes 414(0) to 414(n). In some examples, a gossip protocol may be used by for transmitting the tuples to the RA/CA nodes 414(0) to 414(n).

As indicated by block 616, upon receipt of its respective tuple (U, V, $r_i$) from the applicant node 112, each RA/CA node 414(i) calculates first and second keys, namely public signature key $S_i=V+r_i*G$ and encryption key $E_i=U+r_i*G$ in the same manner as described above in respect of RA node 114(i).

As indicated by blocks 624, 626 and 628 of FIG. 6 and graphically illustrated in FIG. 5, each RA/CA node 414(i) is configured to generate an intermediate certificate $C'_i$, sign the intermediate certificate, and encrypt the signed certificate $C''_i$ to output a PKI based certificate $C_i$.

Referring to block 624, each RA/CA nodes 414(i) is configured to generate intermediate certificate $C'_i=(S_i, \Sigma meta)$. As shown, the intermediate certificate $C'_i$ includes two values, namely: (1) the public signature key $S_i$ calculated by the RA/CA node 414(i); and (2) Σmeta which is the sum of a predetermined set of metadata items. In example embodiments, the metadata items include a unique identification value for the RA/CA node 414(i) and a time stamp.

As shown by block 626, each RA/CA node 414($i$) is configured to sign the intermediate certificate $C'_i$ with its own private key $h_i$ to generate signed intermediate certificate $C''_i$=ECDSA ($h_i$, $C'_i$), where as noted above ECDSA refers to an Elliptical Curve Digital Signature Algorithm such as the ECDSA specified by National Institute of Standards and Technology (NIST) Federal Information Processing Standards (FIPS) publication FIPS PUB 186-4.

As shown by block 628, each RA/CA node 414($i$) is configured to then encrypt the signed intermediate certificate $C''_i$ using the public encryption key $E_i$ to output encrypted PKI-based certificate $C$=AES($E_i$, $C''_i$), where AES refers to an Advanced Encryption Standard (AES) algorithm. In example embodiments the PKI-based certificate $C_i$ is a x.509 PKI certificate. The PKI-based certificate $C_i$ is then transmitted by RA/CA node 414($i$) to the applicant node 112 via SL V2X communication network 140 (block 628). Thus, collectively, the n+1 RA/CA nodes 414(0) to 414($n$) of RA/CA 418 issue a set C of n+1 PKI-based certificates, $C=\{C_0, C_1, \ldots, C_i, \ldots, C_n\}$ with each RA/CA node 414(0) to 414($n$) transmitting a respective certificate to the applicant node 112 using SL V2X communication network 140. The applicant node 112 receives and stores the n+1 certificates $C=\{C_0, C_1, \ldots, C_i, \ldots, C_n\}$ (block 631).

At the completion of the PKI certificate issuing process illustrated by FIGS. 5 and 6, the n+1 certificates $C=\{C_0, C_1, \ldots, C_i, \ldots, C_n\}$ are provided for respective use by the applicant node 112 and n electronic devices 110(1) to 110($n$) of subject vehicle 102. In example embodiments, the applicant node 112 can decrypt each issued certificate $C_i$ using the corresponding private key ($u+r_i$) to recover signed intermediate certificate $C''_i$(block 632). The applicant node 112 can determine the public signature key $S_i$ for each certificate by calculating $S_i=V+r_i*G$. The applicant node 112 can then compute the private signature key $s_i$ for each certificate $C_i$ as follows: $s_i=v+r_i$ (block 634).

Figure 7:
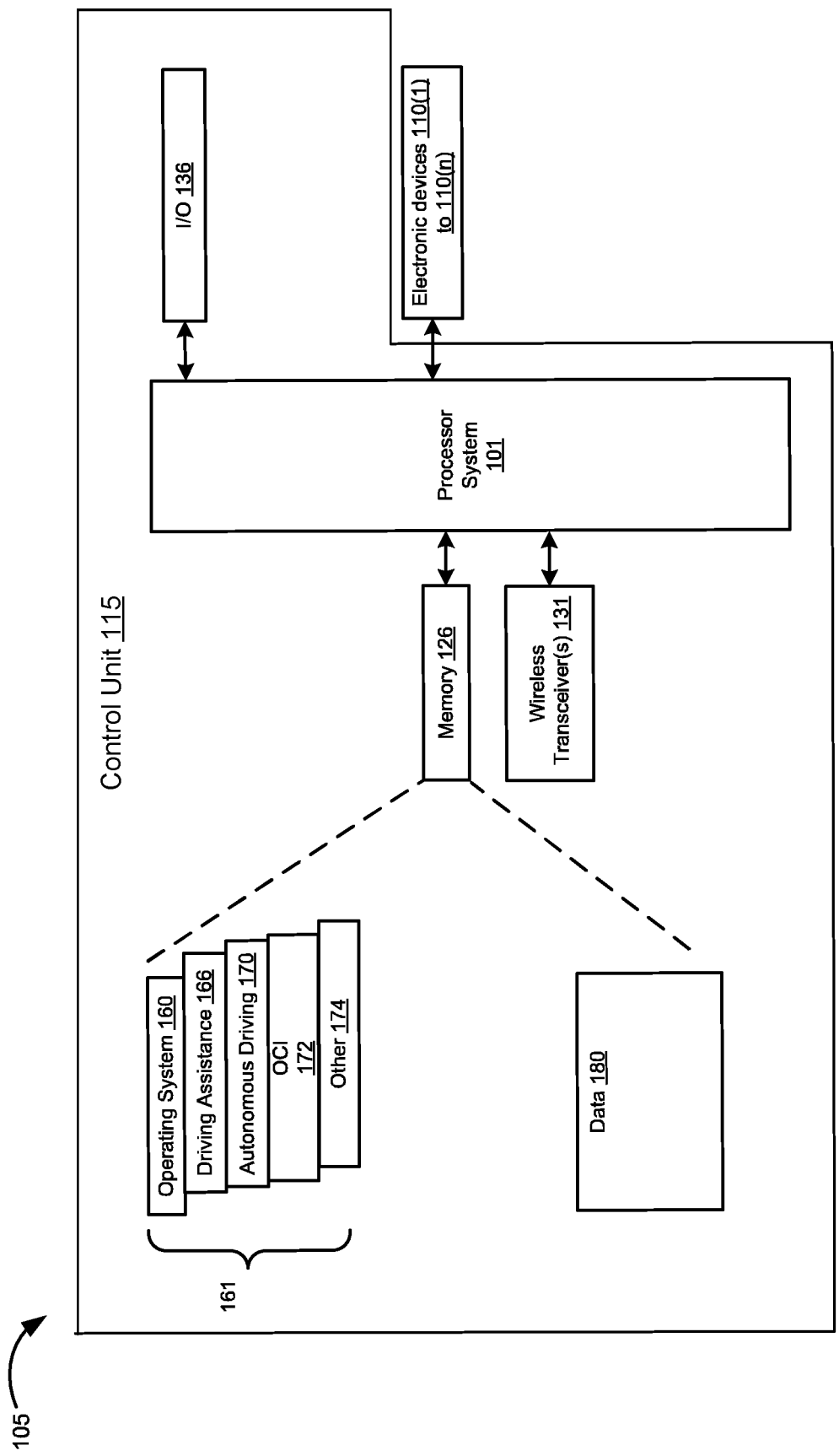
FIG. 7 is a block diagram of a control unit that may be used to implement nodes in the offline PKI certificate issuing system of FIG. 1 or 4, according to example embodiments.

FIG. 7 is a block diagram that illustrates an example of an electronic device that may be used as an on-board control unit 115 in vehicles 102, 104 or infrastructure elements 106. As noted above, control units 115 are used to implement applicant node 112, RA nodes 114($i$), CA nodes 116($k$) and RA/CA nodes 414($i$) according to example embodiments. Control unit 115 may be connected to a plurality of on-board electronic devices 110(1) to 110($n$) that can include devices or units that can sense, collect and process information about a vehicle and its environment. In some examples, control unit 115 may be connected to vehicle systems such as a drive control system and an electromechanical system.

The control unit 115 includes a processor system 101 that is coupled to a plurality of components via a communication bus which provides a communication path between the components and the processor system 101. The processor system 102 is coupled to memory 126 that may include Random Access Memory (RAM), Read Only Memory (ROM), and persistent (non-volatile) memory such as flash erasable programmable read only memory (EPROM) (flash memory). The control unit 115 includes one or more wireless transceivers 131 that enable the control unit 115 to exchange data with WAN 136 and peer-to-peer SL V2X communication network. Control unit 115 may also include a satellite receiver for receiving satellite signals from a positioning satellite network. The control unit 115 may also include one or more I/O interfaces 136 such as a touchscreen and audio input/output interfaces. The processor system 101 may include one or more processing units, including, for example, one or more central processing units (CPUs), one or more graphical processing units (GPUs), and other processing units.

The memory 126 of the control unit 115 has stored thereon sets of software instructions executable by the processor system 102 that configure the control unit 115 to implement a number of systems 161. The systems 161 includes an operating system 160, and an OCI communication system 172 that configures the control unit 115 to implement one or more of the applicant node 112, RA node 114($i$), CA node 116($k$) and RA/CA node 414($i$) functions described above. Systems 161 may also include other modules 174, which may include, for example, mapping module, navigation module, autonomous and assisted driving modules, climate control module, media player module, telephone module and messaging module The memory 126 also stores a variety of data 180. For example, in the case of an applicant node 112 the data 180 may comprise key pairs U,u and V,v; certificates C; generator matrix G; and random value array r.

In example embodiments, on-board electronic devices 110(1) to 110($n$) may be implemented using an arrangement of electronic components similar to that of control unit 115.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Separate boxes or illustrated separation of functional elements of illustrated systems, modules and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, GPUs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the subject description. The scope of the claims should not be limited by the embodiments set forth in the examples, but should be given the broadest interpretation consistent with the description as a whole.

The invention claimed is:

1. A method, comprising:
receiving, by a first certificate authority (CA) node in a peer-to-peer wireless communication network, a first key and a second key from a registration authority (RA) node in the peer-to-peer wireless communication network;
generating, the first CA node, a public key infrastructure (PKI) certificate based on public key information received from an applicant node in the peer-to-peer wireless communication network; and
transmitting, by the first CA node to the applicant node, the PKI certificate using the peer-to-peer wireless communication network,
wherein the applicant node and the first CA node are each pre-configured with a generator matrix, wherein the public key information includes a public signature key generated by the applicant node using the generator matrix, and wherein the generating the PKI certificate at the first CA node comprises:
generating an intermediate certificate based on the first key that is based on: (i) the public signature key generated by the applicant node and (ii) a product of the generator matrix and a random value received from the applicant node;
signing the intermediate certificate; and
encrypting the signed intermediate certificate to produce the PKI certificate, and
wherein the public key information includes a public encryption key calculated by the applicant node using the generator matrix, and wherein encrypting the signed intermediate certificate to produce the PKI certificate is performed using the second key that is based on: (i) the public encryption key and (ii) the product of the generator matrix and the random value received from the applicant node;
receiving, by the first CA node, a first random value calculated at the RA node;
calculating, by the first CA node, a first intermediate value based on the product of the generator matrix and the first random value; and
receiving, by the first CA node, a second intermediate value from a second CA node within the peer-to-peer wireless communication network, the second intermediate value being calculated by the second CA node based on the product of the generator matrix and a second random value calculated at the RA node,
wherein the intermediate certificate generated by the first CA node is also based on the first intermediate value and the second intermediate value.

2. The method of claim 1, wherein the first CA node is a mobile CA node.

3. The method of claim 1, wherein the first CA node calculates the first key and the second key.

4. The method of claim 1,
wherein the peer-to-peer wireless communication network is a sidelink (SL) vehicle-to-anything (V2X) communication network, and
wherein the applicant node and the first CA node are each implemented by processor enabled control units that are located onboard respective vehicles.

5. The method of claim 1, wherein the first CA node is one of a plurality of CA nodes in the peer-to-peer wireless communication network that collectively implement a distributed CA, the method further comprising:
generating respective PKI certificates based on the public key information at the plurality of CA nodes; and
transmitting the respective PKI certificates to the applicant node using the peer-to-peer wireless communication network.

6. A first certificate authority (CA) node comprising:
a processor system;
a wireless transceiver system coupled to the processor system;
memory coupled to the processor system and storing executable instructions that, when executed by the processor system, cause the first CA node to:
generate a public key infrastructure (PKI) certificate based on public key information received from an applicant node in a peer-to-peer wireless communication network; and
transmit, to the applicant node, the PKI certificate using the peer-to-peer wireless communication network,
wherein the public key information includes a public signature key calculated by the applicant node using a generator matrix, and wherein the executable instructions to cause the first CA node to generate the PKI certificate include instructions to cause the first CA node to:
generate an intermediate certificate based on a first key that is based on: (i) the public signature key and (ii) a product of the generator matrix and a random value received from the applicant node;
sign the intermediate certificate; and
encrypt the signed intermediate certificate to produce the PKI certificate
wherein the public key information includes a public encryption key calculated by the applicant node using the generator matrix, and the first CA node is configured to encrypt the signed intermediate certificate to produce the PKI certificate using a second key that is based on: (i) the public encryption key and (ii) the product of the generator matrix and the random value received from the applicant node;
receive a first random value calculated at the RA node;
calculate a first intermediate value based on the product of the generator matrix and the first random value; and
receive a second intermediate value from a second first CA node within the peer-to-peer wireless communication network, the second intermediate value being calculated by a second CA node based on the product of the generator matrix and a second random value calculated at the RA node,
wherein the intermediate certificate generated by the first CA node is also based on the first intermediate value and the second intermediate value.

7. The first CA node of claim 6, wherein the executable instructions further cause the first CA node to:
receive the first key and the second key from a registration authority (RA) node in the peer-to-peer wireless communication network.

8. The first CA node of claim 6, wherein the executable instructions further cause the first CA node to:
calculate the first key and the second key.

9. The first CA node of claim 6, wherein the peer-to-peer wireless communication network is a sidelink (SL) vehicle-to-anything (V2X) communication network and the first CA node is located on a vehicle.

10. The first CA node of claim 9, wherein the applicant node and the CA node are each implemented by processor enabled control units that are located onboard respective vehicles.

11. The first CA node of claim 6, wherein the first CA node is one of a plurality of CA nodes in the peer-to-peer wireless communication network that collectively implement a distributed CA.

12. The first CA node of claim 11, wherein the executable instructions further cause the first CA node to:
generate respective PKI certificates based on the public key information at the plurality of CA nodes; and
transmit the respective PKI certificates to the applicant node using the peer-to-peer wireless communication network.

13. The first CA node of claim 6, wherein the first CA node is a mobile CA node.

14. The first CA node of claim 6, wherein the first CA node calculates the first key and the second key.

15. A non-transitory computer readable storage medium having instructions stored thereon that, when executed by a first certificate authority (CA) node in a peer-to-peer wireless communication network, cause the first CA node to perform operations, the operations including:
receiving a first key and a second key from a registration authority (RA) node in the peer-to-peer wireless communication network;
generating a public key infrastructure (PKI) certificate based on public key information received from an applicant node in the peer-to-peer wireless communication network;
transmitting, to the applicant node, the PKI certificate using the peer-to-peer wireless communication network,
wherein the applicant node and the first CA node are each pre-configured with a generator matrix, wherein the public key information includes a public signature key generated by the applicant node using the generator matrix, and wherein the generating the PKI certificate at the first CA node comprises:
generating an intermediate certificate based on the first key that is based on: (i) the public signature key generated by the applicant node and (ii) a product of the generator matrix and a random value received from the applicant node;
signing the intermediate certificate; and
encrypting the signed intermediate certificate to produce the PKI certificate, and
wherein the public key information includes a public encryption key calculated by the applicant node using the generator matrix, and wherein encrypting the signed intermediate certificate to produce the PKI certificate is performed using the second key that is based on: (i) the public encryption key and (ii) the product of the generator matrix and the random value received from the applicant node;
receiving a first random value calculated at the RA node;
calculating a first intermediate value based on the product of the generator matrix and the first random value; and
receiving a second intermediate value from a second CA node within the peer-to-peer wireless communication network, the second intermediate value being calculated by the second CA node based on the product of the generator matrix and a second random value calculated at the RA node,
wherein the intermediate certificate generated by the first CA node is also based on the first intermediate value and the second intermediate value.

16. The non-transitory computer readable storage medium of claim 15, wherein the first CA node is a mobile CA node.

17. The non-transitory computer readable storage medium of claim 15,
wherein the peer-to-peer wireless communication network is a sidelink (SL) vehicle-to-anything (V2X) communication network, and
wherein the applicant node and the first CA node are each implemented by processor enabled control units that are located onboard respective vehicles.

18. The non-transitory computer readable storage medium of claim 15, wherein the first CA node is one of a plurality of CA nodes in the peer-to-peer wireless communication network that collectively implement a distributed CA, the operations further comprising:
generating respective PKI certificates based on the public key information at the plurality of CA nodes; and
transmitting the respective PKI certificates to the applicant node using the peer-to-peer wireless communication network.

* * * * *